Patented Sept. 9, 1941

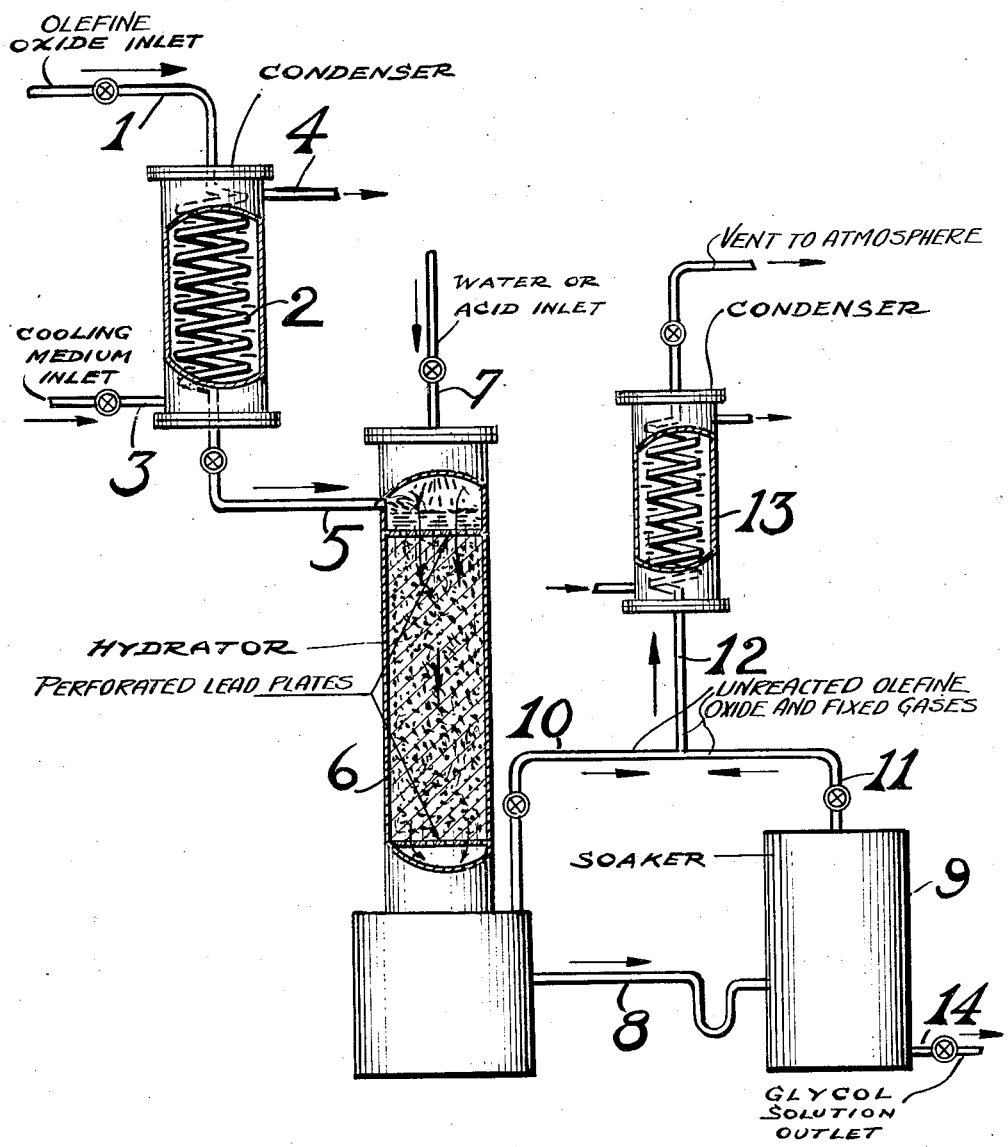

2,255,411

UNITED STATES PATENT OFFICE 2,255,411

MANUFACTURE OF GLYCOLS

Charles A. Cohen, Elizabeth, and Clayton M. Beamer, Roselle, N. J., assignors to Standard Alcohol Co.

Application November 24, 1937, Serial No. 176,166

5 Claims. (Cl. 260—635)

This invention relates to improvements in the manufacture of glycols and more particularly it relates to improvements in converting olefine oxides into glycols whereby the percentage yield of the glycols is materially increased.

In the manufacture of glycols from olefines, chlorine or hypochlorous acid and olefines are reacted to form chlorhydrins. The chlorhydrins in turn are reacted with an alkali, such as lime, to form an olefine oxide. Another method of manufacturing olefine oxides is in the direct oxidation of olefines in the presence of a catalyst. The olefine oxides are then hydrated with water in the presence of an acidic catalyst to glycols.

The hydration of the olefine oxides to glycols was generally aided by heating, and at the same time, some of the glycols formed reacted with the olefine oxides to form polyglycols.

An object of this invention is to reduce the formation of polyglycols to a minimum, if not eliminating the formation entirely, while at the same time obtaining a nearly 100% conversion of the olefine oxides to glycols.

This and other objects of the invention will be clearly understood on reading the following description of the drawing with reference to the drawing which is diagrammatic showing the flow of materials.

Referring to the drawing, numeral 1 denotes a pipe through which 20% by volume of an olefine oxide, such as ethylene oxide, propylene oxide or butylene oxide, together with 80% by volume of water, are passed through condenser 2. Condenser 2 is cooled by means of a brine solution or other cooling medium supplied through inlet 3 and removed through outlet 4. The olefine oxide and water, after being cooled to a temperature below the boiling point of the olefine oxide, for example, when ethylene oxide is used below 10.5° C., propylene oxide below 35° C. and butylene oxide below 51° C., are then passed through pipe 5 into a hydrator 6. Sufficient water is added through pipe 7 to dilute the olefine oxide solution entering the hydrator 6, so that the glycol obtained on hydration will be about 10% by volume of the aqueous solution and not over 15% by volume. Sulfuric acid is also added through pipe 7 to the mixture of olefine oxide and water, so that there is present about 0.5 gram and not less than 0.1 gram of sulfuric acid for every 100 cubic centimeters of 10% aqueous solution of glycol formed. The upper section of the hydrator is a tower containing perforated lead plates in the top which serve as a mixing column below which plates the tower is packed in order to obtain better contact. The lower part of the hydrator 7 is enlarged with a leveling pipe 8 connecting it with soaker 9. No external heat is required to complete the reaction. The heat of the reaction may vaporize some of the unreacted olefine oxide present which, on passing from hydrator 6 and soaker 9 through pipes 10 and 11 into pipe 12, is condensed in condenser 13 and refluxed to hydrator 6 and soaker 9. The glycol solution is removed from soaker 9 through pipe 14 as about a 10% aqueous solution.

The 10% aqueous solution of glycol is neutralized by the addition of an alkali metal hydroxide, such as sodium hydroxide or potassium hydroxide. The neutral solution of glycol is then fractionated, the water being removed by distillation. The glycol is finally concentrated by distilling under vacuum.

The invention is not to be limited to the specific examples, nor to any theories advanced as to the operation of the invention.

We claim:

1. The process of preparing glycols which comprises cooling an olefine oxide to a temperature below the boiling point of the said oxide and passing said olefine oxide continuously into a reaction vessel to which no external heat is added together with sufficient water to form 10% to 15% by volume of aqueous solution of glycol on the hydration of all of the olefine oxide in the presence of 0.1 to 0.5 gram of sulfuric acid for every 100 cc. of the aqueous solution of glycol and continuously withdrawing an aqueous solution of the glycol.

2. The process of preparing ethylene glycol which comprises cooling an aqueous solution of ethylene oxide to a temperature below 10.5° C., adding sufficient water so that when all the ethylene oxide is converted into ethylene glycol a 10% by volume aqueous solution of ethylene glycol will result, adding 0.1 to 0.5 gram of sulfuric acid for every 100 cc. of the solution and hydrating without the application of external heat.

3. The process of preparing propylene glycol which comprises to an aqueous solution of propylene oxide at a temperature below 35° C. adding sufficient water so that when all the propylene oxide is converted into propylene glycol a 10% by volume aqueous solution of propylene glycol will result, adding 0.1 to 0.5 gram of sulfuric acid for every 100 cc. of the solution and hydrating without the application of external heat.

4. The process of preparing butylene glycols which comprises to an aqueous solution of butylene oxide at a temperature below 51° C. adding sufficient water so that when all the butylene oxide is converted into butylene glycol a 10% by volume aqueous solution of butylene glycol will result, adding 0.1 to 0.5 gram of sulfuric acid for every 100 cc. of the solution and hydrating without the application of external heat.

5. The process of preparing glycols which comprises contacting an olefine oxide at a temperature below the boiling point of the said olefine oxide with sufficient water to obtain a 10% by volume aqueous solution of the glycol on hydration of the olefine oxide in the presence of 0.1 to 0.5 gram of sulfuric acid for every 100 cc. of the 10% solution of glycol and maintaining the said olefine oxide and water in contact until substantially all of the olefine oxide is converted into glycol at its own heat of reaction.

CHARLES A. COHEN.
CLAYTON M. BEAMER.